United States Patent
Sabiers et al.

(10) Patent No.: US 8,132,124 B2
(45) Date of Patent: Mar. 6, 2012

(54) METHOD AND SYSTEM FOR REPRESENTING WEB SERVICE ACTIVITY THROUGH A USER INTERFACE

(75) Inventors: Mark L. Sabiers, Ft. Collins, CO (US); David Christopher Davidson, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2428 days.

(21) Appl. No.: 10/387,614

(22) Filed: Mar. 13, 2003

(65) Prior Publication Data

US 2004/0181596 A1    Sep. 16, 2004

(51) Int. Cl.
G06F 17/30 (2006.01)
G06F 11/36 (2006.01)
G06F 9/44 (2006.01)
(52) U.S. Cl. .................. 715/853; 717/125; 719/313
(58) Field of Classification Search .................. 715/853; 717/125; 719/313
See application file for complete search history.

(56) References Cited

U.S. PATENT DOCUMENTS

| | | | |
|---|---|---|---|
| 5,920,313 A | 7/1999 | Diedrichsen et al. | |
| 5,926,176 A * | 7/1999 | McMillan et al. | 715/764 |
| 5,960,199 A * | 9/1999 | Brodsky et al. | 717/128 |
| 6,182,133 B1 | 1/2001 | Horvitz | |
| 6,212,675 B1 * | 4/2001 | Johnston et al. | 717/107 |
| 6,266,805 B1 * | 7/2001 | Nwana et al. | 717/104 |
| 6,285,875 B1 | 9/2001 | Alajoki et al. | |
| 7,062,751 B2 * | 6/2006 | Miyazaki et al. | 717/116 |
| 7,093,237 B2 * | 8/2006 | Moser et al. | 717/129 |
| 7,421,660 B2 * | 9/2008 | Charnock et al. | 715/751 |
| 7,441,233 B1 * | 10/2008 | Orndorff et al. | 717/125 |
| 7,698,686 B2 * | 4/2010 | Carroll et al. | 717/125 |
| 2004/0117768 A1 * | 6/2004 | Chang et al. | 717/125 |
| 2007/0168885 A1 * | 7/2007 | Muller et al. | 715/853 |

OTHER PUBLICATIONS

Mathiske et al., On migrating threads, 1997, Journal of Intelligent Information Systems (0925-9902), m8. vol. 8,Iss.2;p. 167-191.*

* cited by examiner

Primary Examiner — Chat Do
Assistant Examiner — Jordany Nunez (57) ABSTRACT

A method and apparatus for representing Web service activity utilizes a user interface. Components of the user interface present a changing graphical feature based on an activity indicator of the associated web service. The components may vary color or text indicators. Activity indicators may include loading of the Web service object or other states and activities of interest.

7 Claims, 5 Drawing Sheets

METHOD AND SYSTEM FOR REPRESENTING WEB SERVICE ACTIVITY THROUGH A USER INTERFACE

FIELD OF THE INVENTION

The present disclosure relates in general to graphical user interfaces used to track usage of Web service objects.

BACKGROUND

An important technology growing out of Internet usage has been the use of Web services. Web services are network-based (particularly Internet-based) applications that perform a specific task and conform to a specific technical format. Web services are represented by a stack of emerging standards that describe a service-oriented, component-based application architecture, collectively providing a distributed computing paradigm having a particular focus on delivering services across the Internet.

Generally, Web services are implemented as self-contained modular applications that can be published in a ready-to-use format, located, and invoked across the World Wide Web. When a Web service is deployed, other applications and Web services can locate and invoke the deployed service. They can perform a variety of functions, ranging from simple requests to complicated business processes.

Traditionally, Web pages were static files that were downloaded to a user's browser, and the browser interpreted the page for display, as well as handling user input to objects such as forms or buttons. Web services extend the Web's capability to include dynamic content and user interaction. Web services are typically configured to use standard Web protocols such as Hypertext Transfer Protocol (HTTP), Hypertext Markup Language (HTML), Extensible Markup Language (XML) and Simplified Object Access Protocol (SOAP). HTTP, HTML, and XML are typically used to handle user input and output of Web pages and other user data. SOAP is typically used for request and reply messages between Web services.

The use of Web services has made the browser a much more powerful tool. Far from being simple static Web pages, Web services now can handle tasks as complex as any computer program, yet can be accessed and run anywhere due to the ubiquity of browsers and the Internet.

The complex behaviors provided by Web services require more than standard HTML layout skills to implement. The task of writing and debugging Web services falls to computer programmers. Programmers have the ability to design Web service objects, since Web services objects use instructions like traditional programming languages. However, unlike traditional computer programs, Web services are designed primarily for easy interaction with other Web services.

Although traditional programs can be designed to interact with other programs, such interaction is usually limited. Most computer programs can handle simple interactions such as cut and paste, but full interaction such as remote method invocation between disparate programs is the exception rather than the rule.

In contrast, Web services are designed for interaction. This interactivity has been enhanced by the fact they are built upon standard, open, widely adopted, and well understood protocols. It easier than ever to deploy independently developed Web services that interact naturally. However, this high level of interaction makes debugging Web services more difficult. When developing a unified application, standard tools such as debuggers can be used to track program execution. However, Web services may involve multiple programs interacting on various computers anywhere in the world. These interactions may be hard to predict and track during run-time, especially since some public Web services may not be accessible by developers at a troubleshooting level.

SUMMARY

Methods and apparatus are disclosed for representing activity of Web service objects. One disclosed method includes computer-implemented tracking of activity indicators for the Web service objects. The activity indicators are communicated to a graphical user interface, and the activity indicators are displayed as variable graphical features of components of the graphical user interface. The components are arranged to indicate an interrelationship between the Web service objects.

BRIEF DESCRIPTION OF THE DRAWINGS

The invention is described in connection with the embodiments illustrated in the following diagrams.

DETAILED DESCRIPTION

In the following description of various embodiments, reference is made to the accompanying drawings which form a part hereof, and in which is shown by way of illustration various example manners in which the invention may be practiced. It is to be understood that other embodiments may be utilized, as structural and operational changes may be made without departing from the scope of the present invention.

In general, the present disclosure relates to a method and apparatus for determining activity of Web service objects. A graphical user interface (GUI) is used to represent an arrangement of Web service objects as graphical components. A visual property of the components is varied to indicate an activity parameter of the object. The GUI allows the real-time display of object activity and interaction between various objects. The real-time display of object activity advantageously allows a user to discover bottlenecks by showing those services that are "stuck" at a high level of activity, or perhaps not responding at all.

Web Services are network-based (particularly Internet-based) applications. Often, Web services use self-contained, modular applications sometimes referred to as Web service objects. These objects can be invoked across the World Wide Web by using standard protocols of the Web.

Web services are accessed via ubiquitous Web protocols and data formats, such as Hypertext Transfer Protocol (HTTP) and Extensible Markup Language (XML). Thus, at present, the basic Web service platform is XML plus HTTP. XML is a text-based markup language that is currently used extensively for data interchange on the Web.

As with HTML, XML data is identified using tags, which are collectively known as "markup." XML tags identify the data, and act as a field name in the program. XML is a language that allows complex interactions between clients and services, as well as between components of a composite service, to be expressed.

HTTP is an application protocol, and more particularly is a set of rules for exchanging files (text, graphic images, sound, video, and other multimedia files) on a network such as the World Wide Web. While the examples set forth herein are generally described in connection with XML and HTTP, it should be recognized that this is for illustrative purposes, and current and future types of protocols and data formats may also be employed.

More specifically, Web services represent a collection of several related technologies, and involve connections between at least two applications, such as a remote procedure call (RPC), in which queries and responses are exchanged in XML over HTTP. Web service technologies may be defined in terms of various technology layers. The core layers include a transport layer, such as TCP/IP or HTTP as previously described, in which XML messages may be communicated.

An XML messaging layer can be used for invoking RPCs across the Web. Two such protocols, Simple Object Access Protocol (SOAP) and XML-RPC, represent a core layer of Web services that provide this functionality. SOAP and XML-RPC are protocol specifications that define a uniform manner of passing XML-encoded data, as well as defining a manner to perform RPC using HTTP as the underlying communication protocol. XML-RPC is generally associated with HTTP for transport, although SOAP can use other underlying protocols, such as Simple Mail Transfer Protocol (SMTP) to invoke RPCs.

Although Web service objects generally communicate using a standard protocol such as SOAP or XML-PPC, the objects themselves can be created using any programming technology known in the art. Web service objects can be compiled binaries (e.g. C/C++, Ada, Pascal), scripts (e.g. Perl, Python) or interpreted objects (e.g. Java™, Visual Basic®). Two popular forms of Web objects are JavaServer Pages™ (JSP) and Enterprise Java Beans™ (EJB).

Java Server Pages technology is an extension of the Java Servlet technology. Servlets are platform-independent Java server-side modules that can be used to extend the capabilities of a Web server. Servlets are platform-independent Java application components that can be downloaded on demand. JavaServer Pages technology separates the user interface from Servlet-based content generation, enabling designers to change the overall page layout without altering the underlying dynamic content.

JavaServer Pages technology uses XML-like tags that encapsulate the logic that generates the content for the page. Any and all formatting (HTML or XML) tags are passed directly back to the response page. Additionally, the application logic can reside in server-based resources (such as Java-Beans™ component architecture) that the page accesses with these tags.

The JavaBeans specification defines a set of standard component software APIs for the Java platform. JavaBeans (including those used by EJB) are self-contained, reusable software units that can be composed to expose their features (for example, public methods and events) to software tools for manipulation. The EJB model defines an architecture for deploying JavaBeans to enhance Web services in an enterprise environment.

Although various aspects of the present invention may be described in relation to JSP and EJB, it is appreciated that concepts of the present invention are applicable to any Web service technology. Therefore, description of an interface with JSP and EJB are provided for purposes of illustration, and not of limitation.

Figure 1:
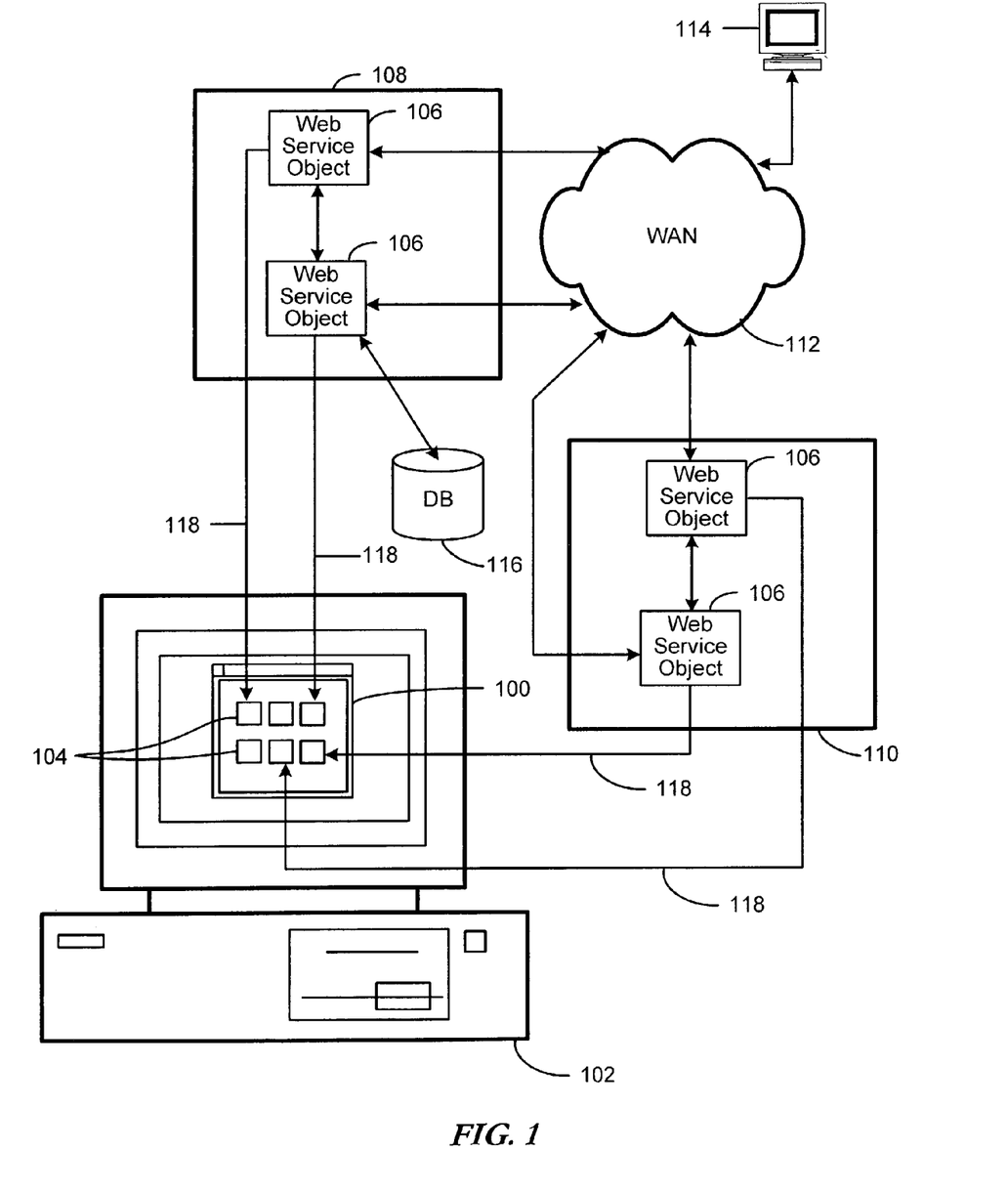
FIG. 1 is a system diagram showing implementation of a graphical user interface according to embodiments of the present invention.

Referring now to FIG. 1, a representative system employing concepts of the present invention is illustrated. A graphical user interface (GUI) 100 is displayed on a computing system 102. The computing system 102 illustrated is a personal computer, although any fixed or mobile computing device may be used to display a GUI 100.

The GUI 100 incorporates one or more graphical components 104 that are used to represent a state of Web service objects 106. The Web service objects 106 are employed on Web servers 108, 110 connected to a network 112. The network 112 illustrated is a wide area network (WAN), such as the Internet. It is appreciated that Web servers 108, 110, and Web service objects 106 can be utilized on any type of networks, such as Local Area Networks (LAN), wireless networks, point-to-point connections, etc.

In general, a client system 114 uses a browser to access a Web server 108, 110. The servers 108, 110 may fulfill client requests using one or more of the Web service objects 106. The Web service objects 106 can perform tasks such as accessing a database 116 and creating dynamic Web pages for the client system 114.

The Web service objects 106 may often interact with other Web services objects 106 as indicated. These interactions may occur with Web service objects 106 on the same server or different servers 108, 110. A GUI 100 according an embodiment of to the present invention can advantageously represent these Web service interactions for a user of the computing system 102.

Although Web service objects 106 are often created in object oriented languages such as Java, it is appreciated a Web service object 106 can be any Web service regardless of whether the underlying technology is actually object oriented. Further, although RPC mechanisms such as SOAP are becoming the standardized protocol for web services, other existing web technologies can be adapted for use as web services. Therefore, any technology such as Common Gateway Interface (CGI) scripts, Active Server Pages (ASP), Macromedia Flash or other server-side technologies can be abstracted as Web service objects 106 for purposes of implementing embodiments of the present invention.

Typically, when developing Web services, the various Web service objects 106 may be invoked by a user request or by other Web service objects 106. Therefore, the interactive and distributive nature of Web service objects 106 may be difficult to view for a Web services developer. The GUT 100 allows a developer (or other interested person such as a Web site administrator) to see interactions by representing Web service object activity and states in the components 104 of the GUI 100. In general, the Web service objects 106 can send activity information to the GUI 100, as indicated by the connections 118.

The connections 118 may be separate connections to either the GUI 100 or the components 104 of the GUI 100. Alternatively, there may be a single connection between the servers 108, 110 and the computing system 102, and all messages are sent through a communication mechanism (e.g. across machines: sockets, any messaging service or protocol, shared network files; on the same machine: shared memory, pipes, Windows events). The connections 1118 can be point-to-point or provided by the WAN 112.

There is typically a one-to-one mapping between the Web service objects 106 and the GUI components 104, so that the user can track a Web service object 106 of interest by watching the associated component 104. However, other mappings may be desirable, such as representing a group of Web service objects 106 by a single component 104.

The components 104 can be used to represent various activity indicators of the Web service objects 106. For example, the components 104 can change graphical features such as color, text, text color, size, outline thickness, flashing frequency variation, audio tonal variation, audio loudness, etc. The components can also advantageously change a color intensity based on the loading of associated Web service objects 106.

The components 104 may be displayed with a pre-defined color coding scheme to indicate various types (or other aspects) of web service objects. By varying color intensity (as opposed to the color itself) the color coding can remain while still communicating an activity indicator. Color intensity is varied by changing RGB values of a component 104. For example, a pale blue might be rendered by setting a component's 32-bit RGB value to (RGB: 234, 234, 255). By equally decreasing the red and green portions of the RGB setting, the component 104 can be rendered in a darker blue, such as (RGB: 126, 126, 255). Note that pure blue is (RGB: 0,0,255). So the darker colors can be used to indicate an activity measure such as Web service loading. Many measures of Web service loading may be devised. In one example, the number of requests being processed, either concurrently or serially, can be used as a measure of loading. Concurrent requests are typically handled by separate threads of execution within the object 106, and loading of concurrent requests can be measure by counting the number of threads. Serial requests can be handled by a single thread of execution, in some cases utilizing some sort of a queue. A usage indicator for serial requests might be the queue size or number of requests per unit of time.

Other object information besides loading may be communicated by Web service objects 106 in a system according to certain embodiments of the present invention. Other data of interest to developers and users might be transaction data rate, debug text, average response time, transaction latency, etc. In general, the term "activity" is used to describe any state or activity indicators of the Web service object 106.

The GUI components 104 may be configured to display any number of Web service activity measures, either singly or in combination. For example, the components 104 may be configured to only display color variations based on loading. However, when the user selects a component 104 with a cursor, a text readout may appear that shows scrolling debug text from the associated Web service object 106.

Figure 2:
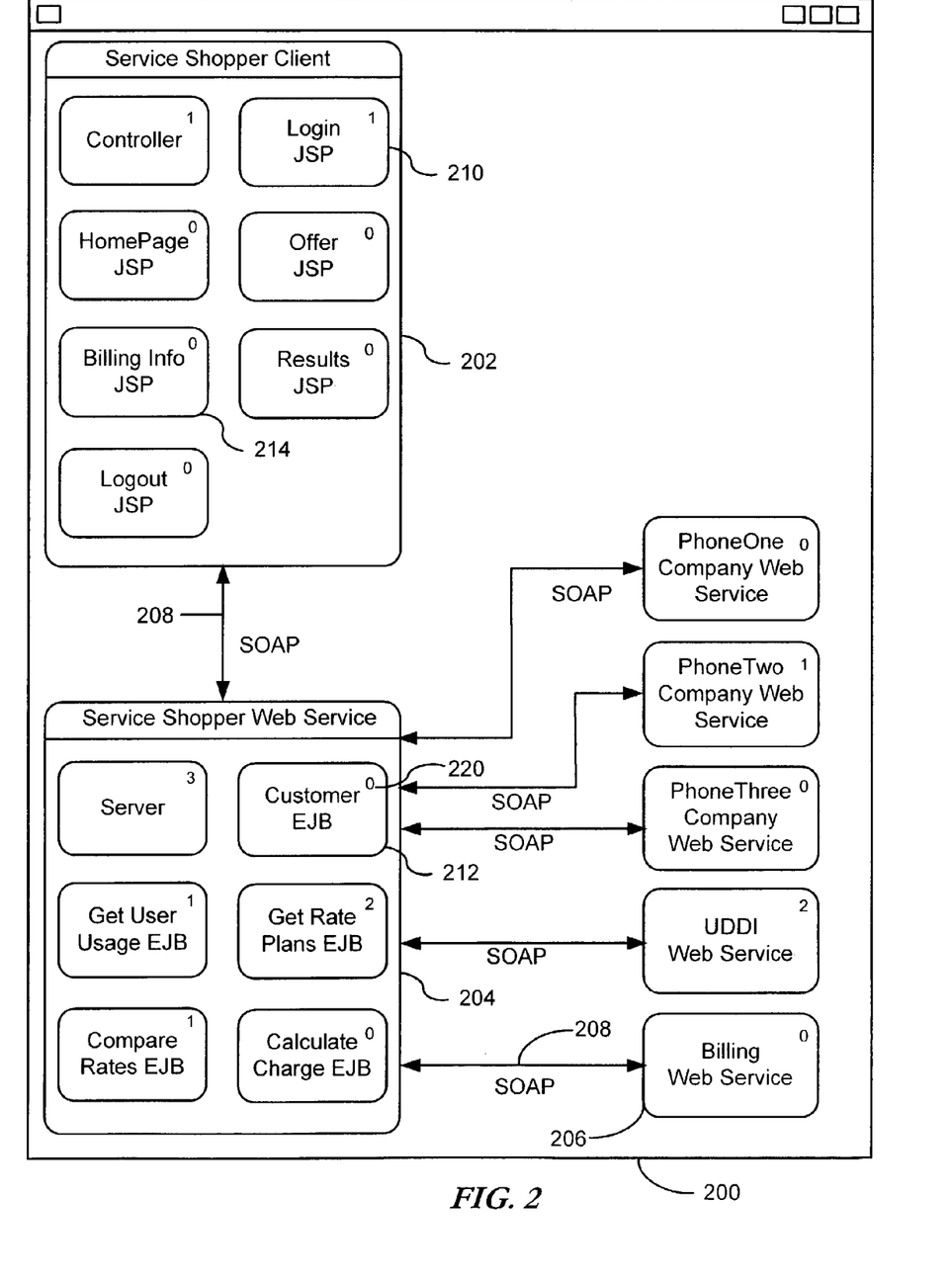
FIG. 2 is an example graphical user interface according to embodiments of the present invention.

Turning now to FIG. 2, an example GUI 200 is shown which can be used to represent various states of Web service objects. The GUI 200 represents a shopper service that can be used to compare various phone service rates and manage user accounts. The Service Shopper Client 202 represents a collection of JSPs that provide content to users of a Web site. The Service Shopper Web Service 204 includes various EJBs that can connect to other Web services such as the Billing Web Service 206.

The various components shown in the GUI 200, such as the Login JSP 210, may include variable graphical features to indicate some state of the underlying Web service object. As previously described, the background color and/or color intensity of the Login JSP component 210 may be varied in accordance with Web service activity. A text indicator 220 may also indicate some activity measure.

FIG. 2 shows connections 208 that can represent SOAP messages or other RPC that may be invoked on Web service objects. The connections 208 may also be implemented as components that present variable graphical features depending on state. For example, the connections 208 could change color and or line thickness whenever the associated inter-object RPCs are being invoked.

The arrangement and behavior of the GUI components can provide dynamic indications of Web service object interactions and interrelationships. A scenario that illustrates this interaction involves the Login JSP 210, the Customer EJB 212, Billing Web Service 206, and the Billing Info JSP 214.

In this scenario, the Login JSP 210 presents an HTML formatted page with inputs for a username and password. The username and password from the Login JSP 210 is used by a Customer EJB 212 to connect to the Billing Web Service 206 to extract account information. The results may be returned by the Customer EJB 212 and shown in a Billing Info JSP 214, where the customer's billing data can be viewed.

In the transaction described above, the user can visualize component interactions in the GUI 200 at each step of the transaction. This can be useful to understand the system and to debug the system. For example, if the login failed, the user could see that a component such as the Billing Web Service 206 failed to indicate any activity. The GUI 200 therefore provides useful troubleshooting information that would otherwise require tracing each step of the transaction, possibly over different servers and using different debugging tools. The GUI indicators can also be useful during testing and implementation to determine relative component workload for system characterization and optimization.

Although the transactions may occur too quickly to easily visualize on the GUI 200, other features may be utilized to enhance visualization. For example, the GUI 200 could be part of an application that records the Web service object data to storage. This stored data could be later used to step through the transactions much like a debugger can step through lines of code.

Figure 3:
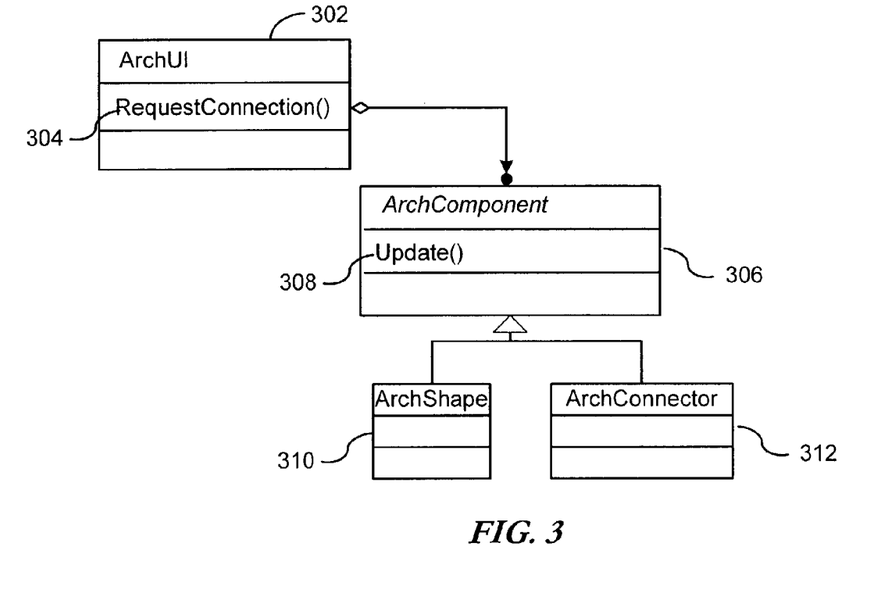
FIG. 3 is a Universal Modeling Language (UML) diagram of example graphical user interface components according to embodiments of the present invention.

Turning now to FIG. 3, various implementation details of GUI components are shown. FIG. 3 includes a Universal Modeling Language (UML) diagram of various components of a GUI implementation. The high level GUI is represented by the ArchUI class 302. ArchUI 302 handles instantiation and deletion of component within the ArchUI 302 drawing area. In this example, the ArchUI class 302 also handles connections to the various Web services, as indicated by the RequestConnection( ) method 304. RequestConnection( ) 304 initiates a network connection with a Web service object having the appropriate interface.

The ArchUI class 302 contains various components that inherit from the ArchComponent( ) base class 306. ArchComponent( ) 306 is a general GUI component template that can be used to represent any aspect of Web service objects. The ArchComponent template 306 includes the Update( ) 308 method used to vary a graphical feature of the component.

As seen in FIG. 3, two classes inherit from ArchComponent 306, ArchShape 310 and ArchConnector 312. ArchShape 310 presents a box with text as seen with Customer EJB 212 in FIG. 2, for example. The ArchShape 310 may include static text such as the Web service name as well as dynamically changing text, such as the numeral 220 indicated in FIG. 2. The ArchConnector 312 may be drawn as a line connecting two or more ArchShape instances 310, such as the connectors 208 seen in FIG. 2.

Figure 4:
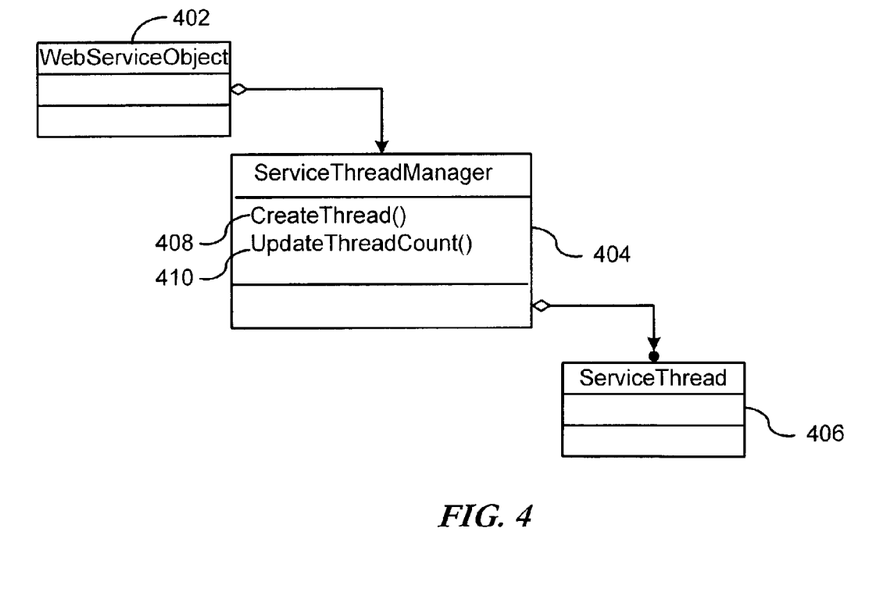
FIG. 4 is a UML diagram of an example Web service object interface according to embodiments of the present invention.

FIG. 4 shows an example server side implementation of a WebServiceObject class 402 that is designed to communicate with a GUI according to embodiments of the present invention. In this example, the WebServiceObject 402 arranged to communicate loading by tracking the number of concurrent service requests.

The WebServiceObject 402 includes a ServiceThreadManager 404 to handle incoming service requests and spawn an instantiation of ServiceThread 406 using CreateThread( ) 408 to handle each incoming request. Each ServiceThread object 406 can handle an individual request of the WebServiceObject 402.

The ServiceThreadManager 404 keeps track of the number of ServiceThread objects 406 currently in use. When a ServiceThread object 406 is created or destroyed, the ServiceThreadManager 404 can update the GUI (such as the ArchUI 302 of FIG. 3) by calling the UpdateThreadCount( ) method 410.

Figure 5:
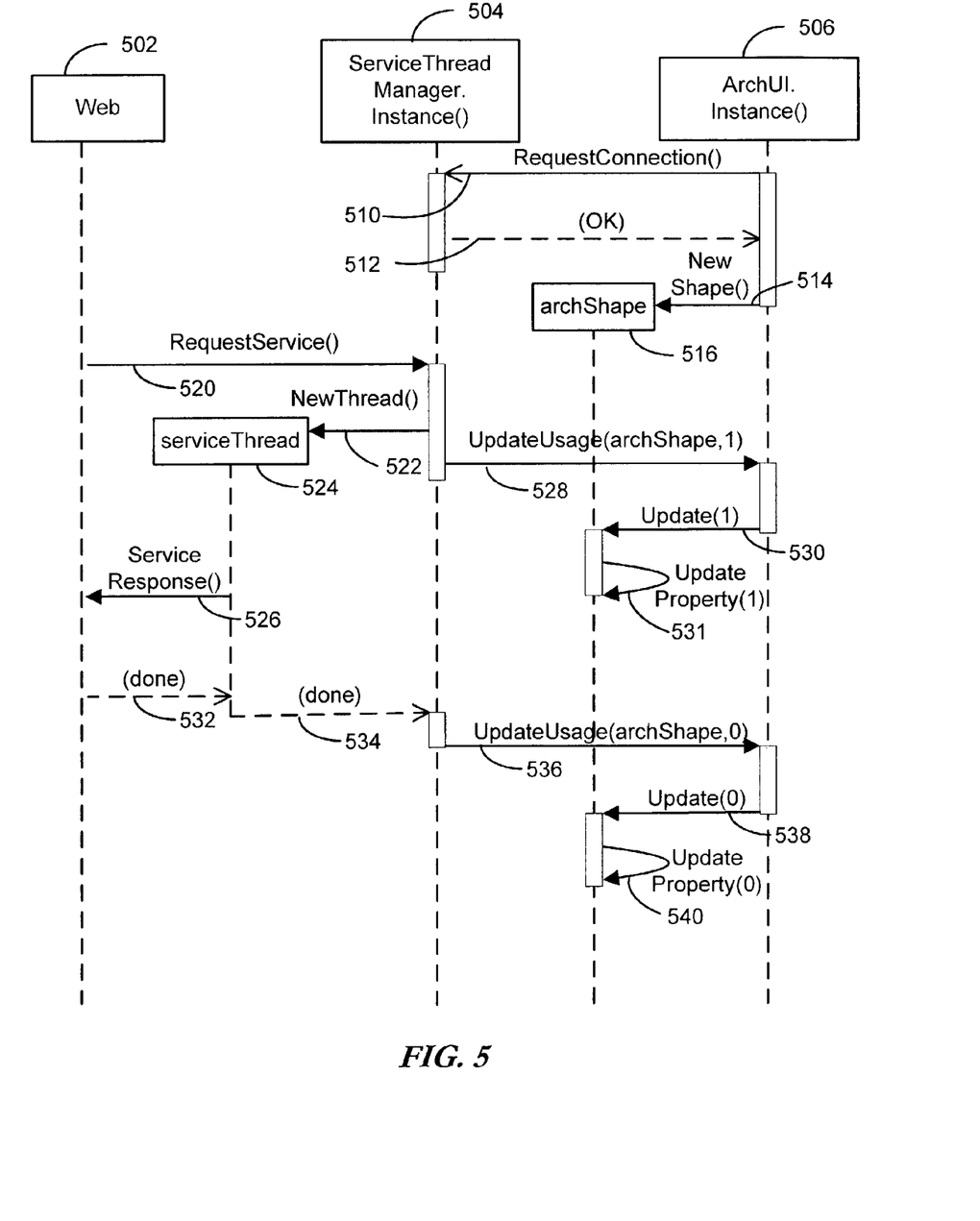
FIG. 5 is a UML sequence diagram showing example user interface interactions with a Web service object according to embodiments of the present invention.

FIG. 5 shows an example interaction of the objects shown in FIG. 4. The scenario of FIG. 5 includes interactions between the Web 502 and instantiations of the ServiceThreadManager 504 on the server side and ArchUI 506 on the GUI side. Both ServiceThreadManager 504 and ArchUI 506 are shown as singleton classes, where the Instance( ) method returns a reference to a single, static instantiation of the class.

When starting, the ArchUI 506 sends a RequestConnection( ) 510 to the ServiceThreadManager 504 to request a connection. The type of connection can be any form of network messaging or IPC arrangement. If the Web service objects and GUI re co-located on the same computer, IPC mechanisms such as shared memory or pipes may be used. If the Web service objects and GUI are located on separate computers, a networking connection is used for communications. Network connections can use TCP/IP socket, UDP/IP datagrams, or any other form of data transfer. For the widest implementation, a fairly simple and standard method of transferring data from Web service object to the GUI is advantageous.

The data transferred between the ArchUI 506 and the ServiceThreadManager 504 can be any text or binary format. For example, the data may XML formatted text to include the easiest adoption across computing platforms and protocols. The RequestConnection( ) 510 method may be a stateless transfer such as an HTTP session or may require a connection state be maintained. Typically, the success of the request is returned 512 to the ArchUI 506 in response to the RequestConnection( ) 510 call.

The return 512 from the ServiceThreadManager 504 may also include some state data, such as the Web service object's name and the current loading. The ArchUI 506 can use this return data to instantiate 514 an ArchShape object 516. The ArchUI 506 may also instantiate ArchConnector objects (not shown) to show connections to and from the ArchShape object 516.

When the Web service object receives a service request 520, the ServiceThreadManager 504 instantiates 522 a ServiceThread object 524 to handle the request. The ServiceThread object 524 is a separate thread of execution which responds 526 to the service request 520. The ServiceThreadManager 504 updates usage 528 to the ArchUI 506, which in turn locates the ArchShape 516 associated with this Web service objects and calls the ArchShape object's Update( ) method 530. The ArchShape object 516 internally alters its graphical features with the UpdateProperty( ) method 531, such as changing a background color and/or text.

When the transaction handled by the ServiceThread 524 is complete 532, the ServiceThreadManager 504 detects this 534 and again updates usage 536 to the ArchUI 506. As before, the ArchUI 506 and ArchShape 516 handle the update 538, 540, this time showing a reduction in the load indicated by the completion of the ServiceThread 524.

While the previous description provides one example of communications between a GUI and a Web service, it is appreciated that many alternate implementations are possible. For example, the GUI could be configured for listening for incoming connections, and the Web service objects would initiate connections with the GUI. Various different server side implementations could be utilized, all conforming to a common data/message transfer protocol compatible with the GUI.

Figure 6:
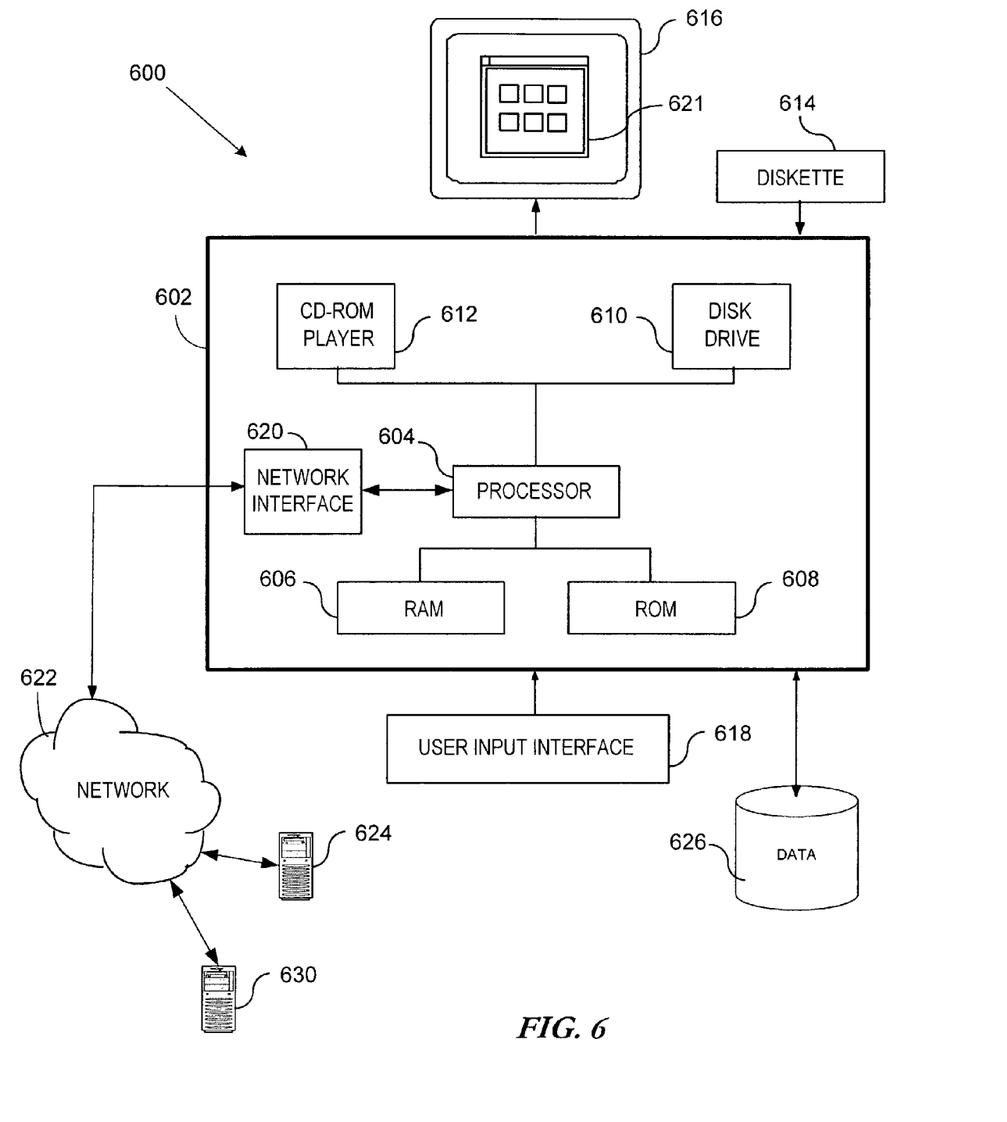
FIG. 6 is a diagram of a system in which a graphical user interface may be deployed according to embodiments of the present invention.

FIG. 6 shows a system 600 utilizing concepts of the present invention. The system includes a computing apparatus 602 with a processor 604 and coupled to some form of data storage. The data storage may include volatile memory such as RAM 606. Other devices that the apparatus 602 may use for data storage and retrieval include a ROM 608, disk drive 610, CD-ROM 612, and diskette 614. A display 616 and user input interface 618 are attached to the computing apparatus 602 to allow data input and display of the GUI 621. The computing apparatus 602 includes a network interface 620 that allows the apparatus to communicate with Web servers 624, 630 and other computing devices across a network 622.

In one embodiment of the invention, the computing apparatus 602 connects to Web objects running on the Web servers 624, 630. The Web objects may contain interface code for communicating with the GUI 621 to provide a real-time display of Web service object activity. The activity indicators of the Web service objects may also be recorded to persistent storage 614, 610 or a database 626.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. The concepts of the present invention can be implemented in any combination of hardware and software.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A computer-implemented method for representing activity of Web service objects, comprising:

tracking activity indicators for the Web service objects, wherein the Web service objects execute on a plurality of servers;

communicating the activity indicators from the Web service objects to a graphical user interface;

displaying the activity indicators as variable graphical features of components of the graphical user interface, the components arranged to indicate an interrelationship between the Web service objects, wherein tracking activity indicators for the Web service objects comprises tracking usage indicators of the Web service objects, wherein tracking usage indicators for the Web service objects comprises counting threads of execution of the Web service object, the communicating includes communicating counts of threads of execution as activity indicators of the Web service objects, and the displaying includes displaying the thread counts as variable graphical features.

2. A computer-implemented method for representing activity of Web service objects, comprising:
- tracking activity indicators for the Web service objects, wherein the Web service objects execute on a plurality of servers;
- communicating the activity indicators from the Web service objects to a graphical user interface;
- displaying the activity indicators as variable graphical features of components of the graphical user interface, the components arranged to indicate an interrelationship between the Web service objects,
- wherein displaying the activity indicators comprises displaying the activity indicators in real time.

3. An article of manufacture for representing activity indicators of Web service objects, comprising: a display;
- a computer-readable medium configured with instructions for causing a computer to perform the steps of:
- reading the activity indicators of the Web service objects, wherein the Web service objects execute on a plurality of servers;
- communicating the activity indicators to a graphical user interface of the display; and
- displaying the activity indicators as variable graphical features of components of the graphical user interface, the components arranged to indicate an interrelationship between the Web service objects,
- wherein the computer-readable medium is further configured with instructions for causing a computer to display the activity indicators in real-time.

4. A processor-based method for representing activity of Web service objects, comprising:
- establishing a plurality of respective connections between a plurality of instances of a graphical user interface object and instances of a plurality of web service objects;
- tracking changes in one or more activity indicators associated with each instance of the web service objects by the instances of the web service objects, wherein the one or more activity indicators include a respective count of threads active in the associated instance of the web service object;
- transmitting, for each activity indicator, data descriptive of the activity indicator from the instance of the web service object to an instance of the graphical user interface object associated with the activity indicator in response to a change in the activity indicator; and
- displaying, for each activity indicator, an associated variable graphical feature of a component that corresponds to an associated instance of a web service object, the components displayed in an arrangement that indicates an interrelationship between the web service objects and one variable graphical feature of a component varying in response to a change in data descriptive of the activity indicator for the associated instance of a web service object.

5. The method of claim 4, wherein the displaying includes varying a graphical feature of a component in real time as data descriptive of the associated activity indicator is received.

6. The method of claim 4, wherein the one or more activity indicators include a number of queued requests in the associated instance of the web service object.

7. The method of claim 4, wherein the one or more activity indicators include a number of requests processed per unit of time in the associated instance of the web service object.

* * * * *